(12) United States Patent
Suzuki

(10) Patent No.: US 11,429,323 B2
(45) Date of Patent: Aug. 30, 2022

(54) IMAGE FORMING APPARATUS, CONTROL METHOD, AND STORAGE MEDIUM FOR PERFORMING PRINT SETTINGS WITH CLOUD PRINTING

(71) Applicant: CANON KABUSHIKI KAISHA, Tokyo (JP)

(72) Inventor: Shinya Suzuki, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/859,319

(22) Filed: Apr. 27, 2020

(65) Prior Publication Data
US 2020/0356321 A1  Nov. 12, 2020

(30) Foreign Application Priority Data
May 8, 2019  (JP) .............................. JP2019-088591

(51) Int. Cl.
*G06F 3/12* (2006.01)

(52) U.S. Cl.
CPC .......... *G06F 3/1224* (2013.01); *G06F 3/1203* (2013.01); *G06F 3/126* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 8,953,192 B2* | 2/2015 | Gutnik | .................. | G06F 3/1292 358/1.14 |
| 8,964,218 B2* | 2/2015 | Oshima | .................. | G06F 3/1236 358/1.15 |
| 9,201,621 B2* | 12/2015 | Minagawa | ............ | G06F 3/1222 |
| 9,606,760 B2* | 3/2017 | Tanaka | .................. | G06F 3/1274 |
| 10,127,182 B2* | 11/2018 | Kawaura | ................. | G06F 13/20 |
| 2009/0241024 A1* | 9/2009 | Shiohara | ............... | G06F 3/1261 358/1.15 |
| 2012/0019865 A1* | 1/2012 | Takahashi | ............. | G06F 3/1204 358/1.15 |

FOREIGN PATENT DOCUMENTS

JP  2013238924 A  11/2013

* cited by examiner

*Primary Examiner* — Paul F Payer
(74) *Attorney, Agent, or Firm* — Canon U.S.A., Inc. IP Division

(57) ABSTRACT

Printer identification information is added when a printer is registered to a cloud service. In a case where a user selects, on a client terminal, a printer registered with the cloud print service, found in searching, a print setting application is automatically downloaded and installed by using the printer identification information registered with the cloud service.

37 Claims, 15 Drawing Sheets

FIG.5

| DEVICE NAME | HWID | CategoryID | IP ADDRESS |
|---|---|---|---|
| Can iR-ADV CCCC | iR-ADV_CCCC61B1 | CanOIP | xxx.xxx.xxx.001 |
| Can iR-ADV XXXX | iR-ADV_XXXXD80D | CanOIP | xxx.xxx.xxx.111 |
| Can MF WWWW | MF_WWWWD43F | CanOIP | xxx.xxx.xxx.112 |
| Can LBP VVVV | LBP_VVVV7547 | CanOIP | xxx.xxx.xxx.113 |
| Can OIP Common Printer | — | CanOIP | — |
| Can MP DDDD | MP_DDDD5E25 | CanIJ | xxx.xxx.xxx.120 |
| Can IJ Common Printer | — | CanIJ | — |
| AAAA BBBB | AAAACF39 | AAAA | xxx.xxx.xxx.222 |
| AAAA Common Printer | — | AAAA | — |
| YYYY ZZZZ | YYYY62B5 | YYYY | xxx.xxx.xxx.234 |
| YYYY Common Printer | — | YYYY | — |

FIG.7

```
<p: PrinterElements>
  <p: ElementData p: Valid = "true" p: Name = "p: PrinterDescription">
    <p: PrinterDescription> <p: ColorSupported> true </p: ColorSupported>   701
      <p: DeviceId>MFG: Can; MDL: iR-ADV CCCC; CLS: PRINTER; DES: Can iR-ADV CCCC; CID: CA_OIP_COMMON; CMD: LIPSLX, PS, PostScript, PCL, PJL, CPCA; </p: DeviceId>
      <p: MultipleDocumentJobsSupported> false </p: MultipleDocumentJobsSupported>                                                              702
      <p: PagesPerMinute> 60 </p: PagesPerMinute>
      <p: PagesPerMinuteColor> 60 </p: PagesPerMinuteColor>
      <p: PrinterName xml: lang = "ja"> Can iR-ADV CCCC </p: PrinterName>
      <p: PrinterInfo xml: lang = "ja"> Can Pull Print Printer </p: PrinterInfo>
      <p: PrinterLocation xml: lang = "ja"> B1 - 4F </p: PrinterLocation>
      <p2: SupportsWSPrintV20> true </p2: SupportsWSPrintV20>
  </p: PrinterDescription>
</p: ElementData>
```

| PRINT JOB ID | PRINT JOB NAME | CategoryID |
|---|---|---|
| 1 | aaa.doc | CanOIP |
| 2 | bbb.xls | CanIJ |
| 3 | ccc.pptx | AAAA |
| 4 | ddd.doc | CanOIP |
| 5 | eee.pdf | CanOIP |
| 6 | fff.pptx | CanIJ |
| 7 | ggg.xps | AAAA |
| 8 | hhh.doc | CanOIP |
| 9 | iii.pptx | YYYY |
| 10 | jjj.pdf | CanOIP |
| 11 | kkk.pdf | YYYY |

FIG.12

| PRINT JOB ID | PRINT JOB NAME | CategoryID |
|---|---|---|
| 1 | aaa.doc | CanOIP |
| 4 | ddd.doc | CanOIP |
| 5 | eee.pdf | CanOIP |
| 8 | hhh.doc | CanOIP |
| 10 | jjj.pdf | CanOIP |

IMAGE FORMING APPARATUS, CONTROL METHOD, AND STORAGE MEDIUM FOR PERFORMING PRINT SETTINGS WITH CLOUD PRINTING

BACKGROUND

Field of the Disclosure

The present disclosure relates to an image forming apparatus, a control method, and a storage medium.

Description of the Related Art

Japanese Patent Application Laid-Open No. 2013-238924 discusses cloud printing such as Google Cloud Print.

In a print setting provided by a cloud printer, detailed print setting, such as a stapleless binding setting and a saddle stitching binding setting, is not possible with settings of color/monochrome, the number of copies, and a sheet type.

SUMMARY

According to an aspect of the present disclosure, an information processing apparatus connectable to a server system including a first print queue for managing a print job to be transmitted to an image forming apparatus, includes a search unit configured to search for and obtain a list of available print queues, including the first a print queue, on the server system, a generation unit configured to generate, in the information processing apparatus, a second print queue for managing a print job transmitted to the first print queue, based on the user selection of the first print queue, and a download unit, configured to download a print setting application that allows the user to perform print setting to be included in the print job, based on information related to the first print queue.

Further features of the present disclosure will become apparent from the following description of exemplary embodiments with reference to the attached drawings.

BRIEF DESCRIPTION OF THE DRAWINGS

FIG. 5 is a table illustrating an example of a printer information database held by the cloud print service.

FIG. 7 is a diagram illustrating an example of device information acquired from the printer in the cloud print service.

FIG. 10 is a table illustrating an example of a print job database held by a print job storage area in the cloud print service.

FIG. 12 is a table illustrating an example of a print job list printable by printer as a request source in the cloud print service.

DESCRIPTION OF THE EMBODIMENTS

Figure 1:
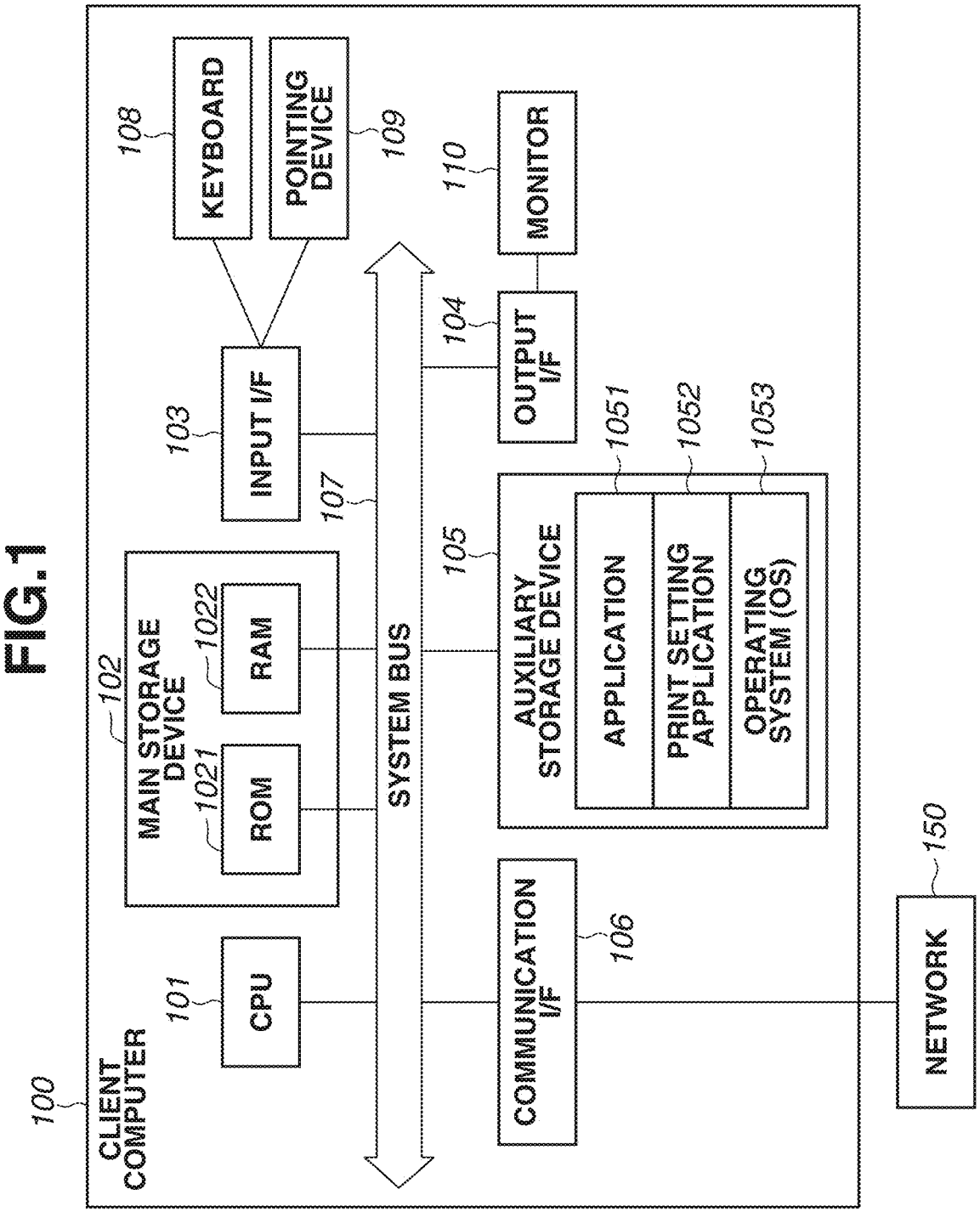
FIG. 1 is a block diagram illustrating a hardware configuration of a client computer.

FIG. 1 is a block diagram illustrating a hardware configuration of a commonly used computer (information processing apparatus) according to a first exemplary embodiment of the present disclosure. Unless otherwise noted, the present disclosure is applicable to a system including a single apparatus, a system including a plurality of apparatuses, and a system that performs processing through network connection as long as the system can execute functions of the present disclosure. A client computer 100 includes a system illustrated in FIG. 1. The details thereof are described.

A central processing unit (CPU) 101 controls the entire apparatus based on programs stored in a read-only memory (ROM) 1021 or a random access memory (RAM) 1022 of a main storage device 102, or in an auxiliary storage device 105.

The RAM 1022 is also used as a work area when the CPU 101 performs various kinds of processing. The auxiliary storage device 105 stores, for example, an operating system (OS) 1053, an application 1051, a print setting application 1052. In the following description, the main storage device 102 and the auxiliary storage device 105 are collectively referred to as storage devices.

An input device such as a pointing device 109 and a keyboard 108 represented by a mouse and a touch panel is a device that is connected through an input interface (I/F) 103 and allows a user to input various kinds of instructions to the computer.

An output I/F 104 is an interface to output data to outside, and outputs data to an output device such as a monitor 110.

The printer 200 is connected through a network 150 via a communication I/F 106. A common data system bus 107 is used to exchange data between the interfaces and the modules. In addition, the CPU 101 performs processing based on the programs stored in the storage devices to carry out processing in steps in sequence diagrams described below.

Figure 2:
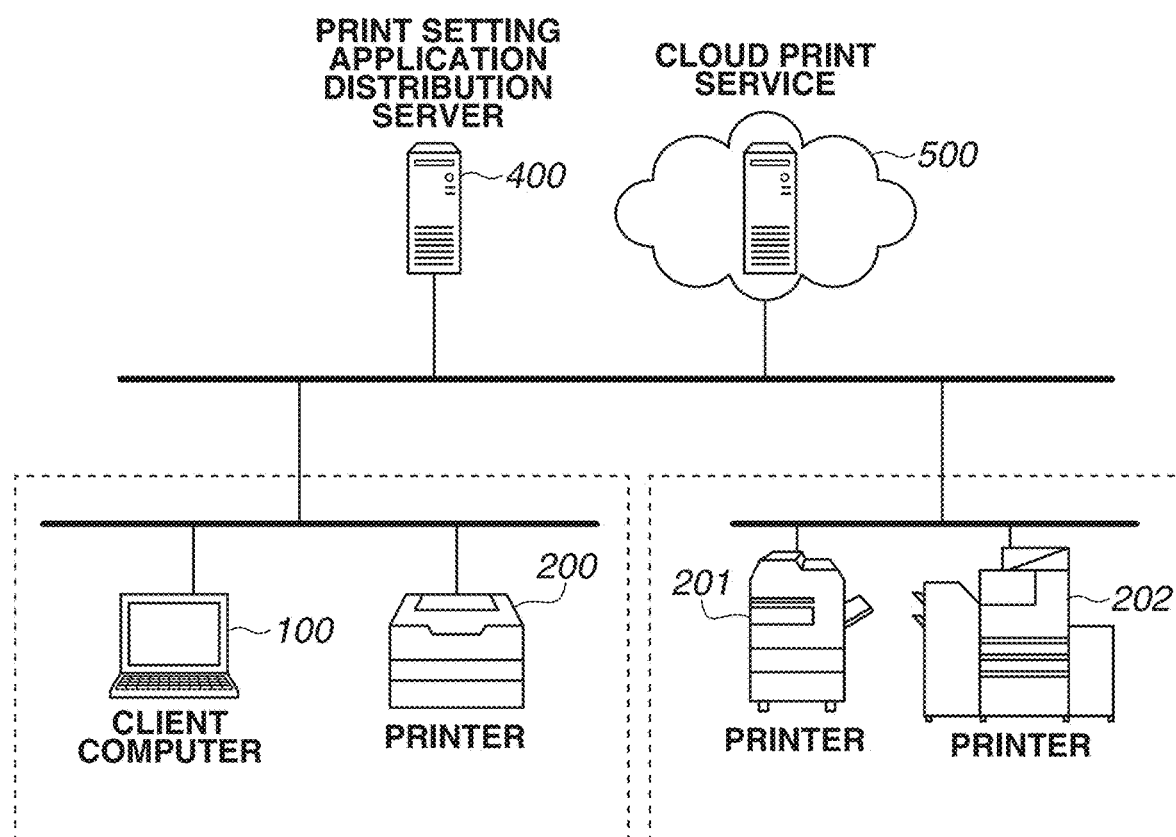
FIG. 2 is a diagram illustrating a network configuration according to an exemplary embodiment.

FIG. 2 is a diagram illustrating a network configuration in which an environment of the network 150 is simplified, according to the present exemplary embodiment. The client computer 100 and the printer 200 are connected to the network 150. The client computer 100 and the printer 200 are connected to the same intra-network, and can communicate with each other. Further, a printer 201 and a printer 202 are connected to a different intranet, and are connected to the client computer 100 and the printer 200 through the Internet. A print setting application distribution server 400 is connected to the network 150, and a system that can provide a print setting application 1052 to the client computer 100 is constructed.

A cloud print service 500 is constructed on a cloud (i.e., server system) including a plurality of servers (i.e., on server system) on the Internet. In the present exemplary embodiment, the cloud print service 500 is connectable to each of the intranets, and is connectable to the client computer 100, the printer 200, the printer 201, and the printer 202 through the Internet.

In the cloud print service 500, an account is managed using a user identification (ID) and a password. The user can access the cloud print service 500 by using the account. The account used to manage the user may be associated with a login user of the operating system 1053. In such a case, input of the user ID and the password is unnecessary.

Figure 3:
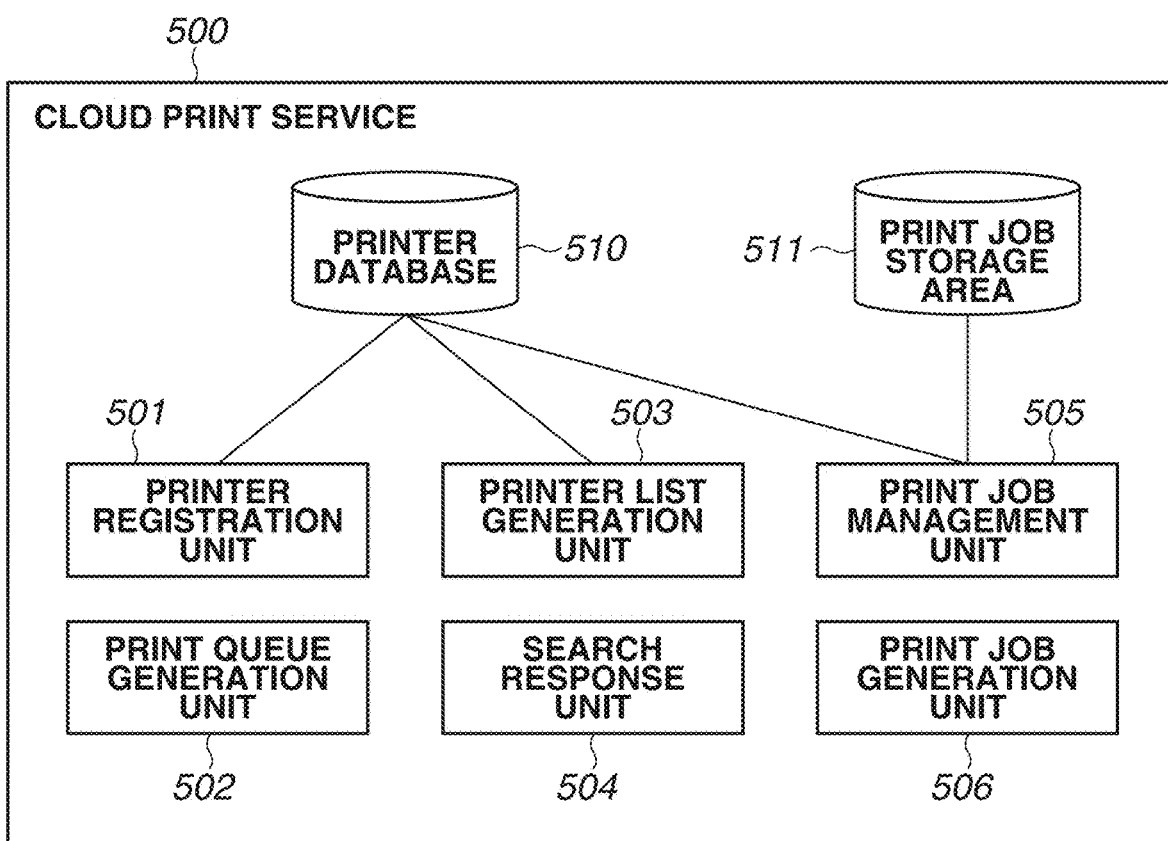
FIG. 3 is a block diagram illustrating a functional configuration of cloud print service.

FIG. 3 is a block diagram of the cloud print service 500 according to the present exemplary embodiment. The cloud print service 500 is a service present on the cloud through the Internet, and can provide functions relating to printing. In the present exemplary embodiment, the cloud print service 500 includes functions of a printer registration unit 501, a print queue generation unit 502, a printer list generation unit 503, a search response unit 504, and a printer database 510. The cloud print service 500 further includes functions of a print job management unit 505, a print job generation unit 506, and a print job storage area 511. These functions may be provided in another cloud print service that cooperates with the cloud print service 500. In the following, although the printer 200 is described as an example, the printer 201 or the printer 202 that is connectable to the cloud print service 500 also can achieve the similar processing.

In a case where printer registration is instructed from the printer 200, the printer registration unit 501 causes the print queue generation unit 502 to generate a print queue, and registers the generated print queue in the printer database 510 in association with printer identification information. Registration of the print queue of the printer and the printer identification information in association with each other is referred to as registration of the printer. The processing will be described below with reference to a sequence diagram in FIG. 4.

Further, the print job management unit 505 receives a print job from the client computer 100, and directly transmits the print job to the printer 200 as appropriate. Alternatively, the print job management unit 505 stores the print job in the print job storage area 511 once, passes the print job to the print job generation unit 506 to convert the print job into an appropriate file at a timing when an output destination printer is determined, and then transmits the file to the printer 200. The processing to transmit or store the print job will be described below with reference to a flowchart in FIG. 9.

Figure 4:
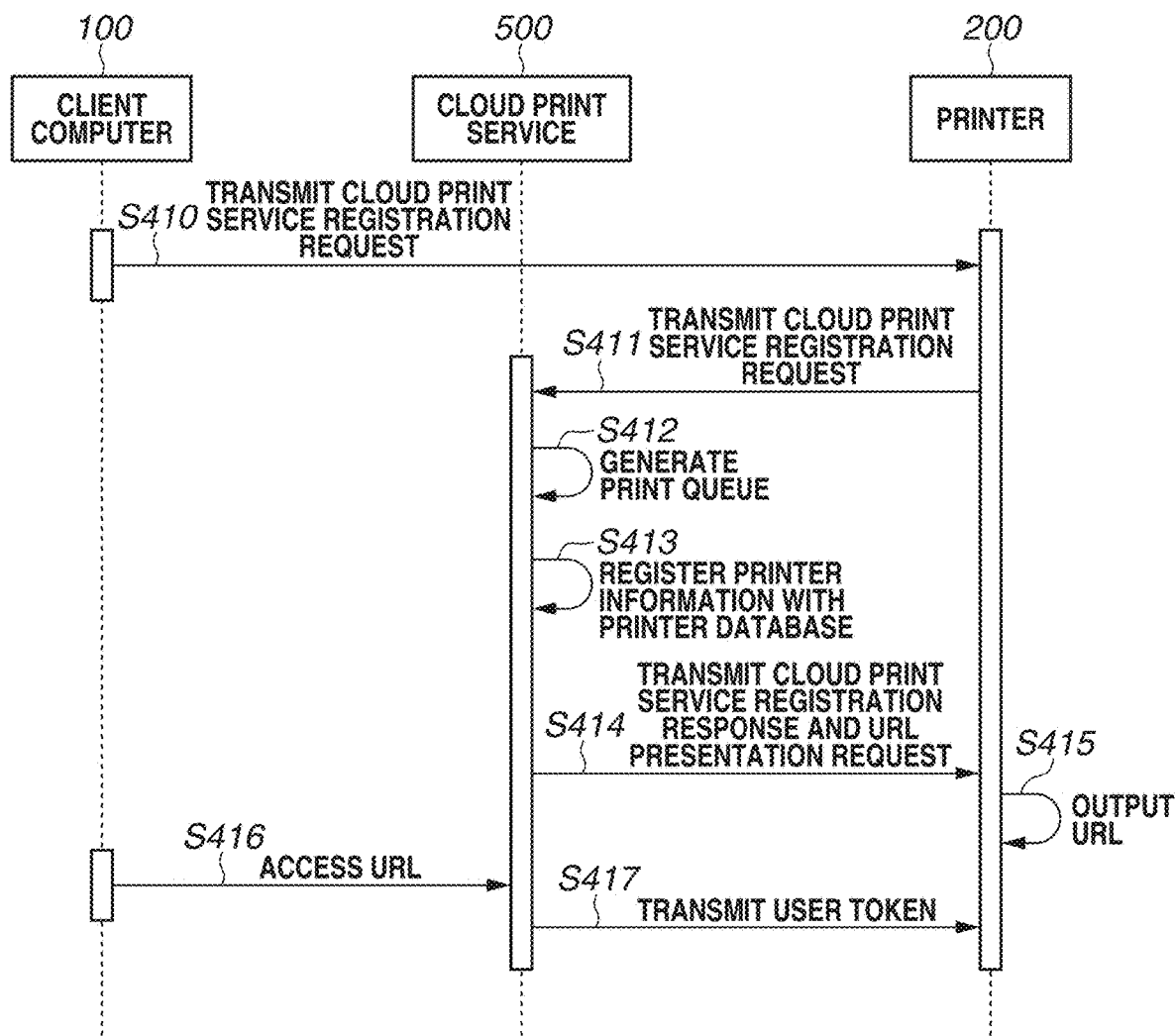
FIG. 4 is a sequence diagram illustrating a sequence to register a printer to the cloud print service.

FIG. 4 is a sequence diagram of the processing to register the printer 200 to the cloud print service 500 according to the present exemplary embodiment.

The printer 200 supports a cloud print function (function to receive print job from cloud print service and to perform printing), and a web user interface (UI) function to operate the printer 200. The web UI function is a function to generate a UI and to release the UI on the network. The client computer 100 supports a cloud print client function (function to transmit a file to a cloud print service) and a web UI client web browser) to operate the web UI. The cloud print service 500 indicates the cloud print service on the Internet.

The user opens the web UI of the printer 200 with use of the web UI client of the client computer 100, and selects, on the web UI, a button to register the printer 200 to the cloud print service. When the button is selected, the client computer 100 transmits a cloud print service registration request to the printer 200 in step S410. Upon receiving the request in step S410, the printer 200 transmits a cloud print service registration request to the cloud print service 500 in step S411. As described above, in the present exemplary embodiment, the registration request is transmitted from the web UI client of the client computer 100. However, the request may not necessarily be transmitted from the client computer 100 if the request can be transmitted from an input device, for example, a panel attached to the printer 200. The cloud print service registration request transmitted in step S410 includes information on the printer 200. The information on the printer 200 includes, for example, a name of the printer 200, a number (HWID) for identification of a model number of the printer 200, a name or number (CategoryID) for identification of a type of the printer 200, and interact protocol (IP) address information. In particular, the name or number (CategoryID) for identification of the type of the printer can be information for identification of a model series defined by a vendor that has manufactured the printer. For example, it is possible to identify whether the printer is an inkjet printer or the laser beam printer by referring to the Category ID.

Upon receiving the request in step S411, the cloud print service 500 causes the print queue generation unit 502 to generate a print queue in step S412 Which will be used to transmit a print job to the printer 200. The print queue is generated by using the name of the printer (device name), the HWID for identification of the model of the printer, the CategoryID for identification of the type of the printer, and the IP address of the printer that are received information about the printer 200. In step S413, the cloud print service 500 registers the information associated with the printer 200 to the printer database 510. The details of the processing to generate the print queue in step S412 and the processing to register the information on the printer 200 to the printer database 510 will be described below with reference to a flowchart in FIG. 6.

FIG. 5 is a table illustrating an example of the printer database 510 held by the cloud print service 500. The device name indicates a printer name (device name) acquired from the printer 200 at the time of registration. The HWID indicates an identifier (model-dependent identifier, i.e., identification information derived from a portion of the model number of an image forming apparatus) used to identify the model of the printer 200. The CategoryID indicates an identifier common to a plurality of devices (common identification information). The CategoryID may be identification information for identifying a vendor, or may be identification information different for each category of product of a specific vender. For example, a laser beam printer and an ink jet printer of a specific vender can have different Category IDs.

When registration with the printer database 510 is completed, the cloud print service 500 transmits a cloud print service registration request response and a registration URL presentation request including a registration URL for cloud print registration, to the printer 200 in step S414. When receiving the cloud print service registration request response and the registration URL presentation request in step S414, the printer 200 notifies the user of the registration URL information by displaying the registration URL information on the attached panel or outputting a sheet on which the registration URL information is described, in step S415. In addition, the printer 200 may notify the client computer 100 of the registration URL information through the web UI.

In step S416, the user accesses the cloud print service 500 located at the registration URL presented by the printer 200.

At this time, input of the user ID and the password is necessary because it is necessary for the user to log into the cloud account accessible to the cloud print service 500.

The cloud print service 500 associates the user with the printer 200 based on the registration URL including the cloud account and the printer information. An example of the association method is associating the printer information with a user token. However, the association method is not limited thereto. In step S417, the user token including the information on the cloud print service 500 is transmitted to the printer 200, and the processing to register the printer 200 to the cloud print service 500 is ended.

Figure 6:
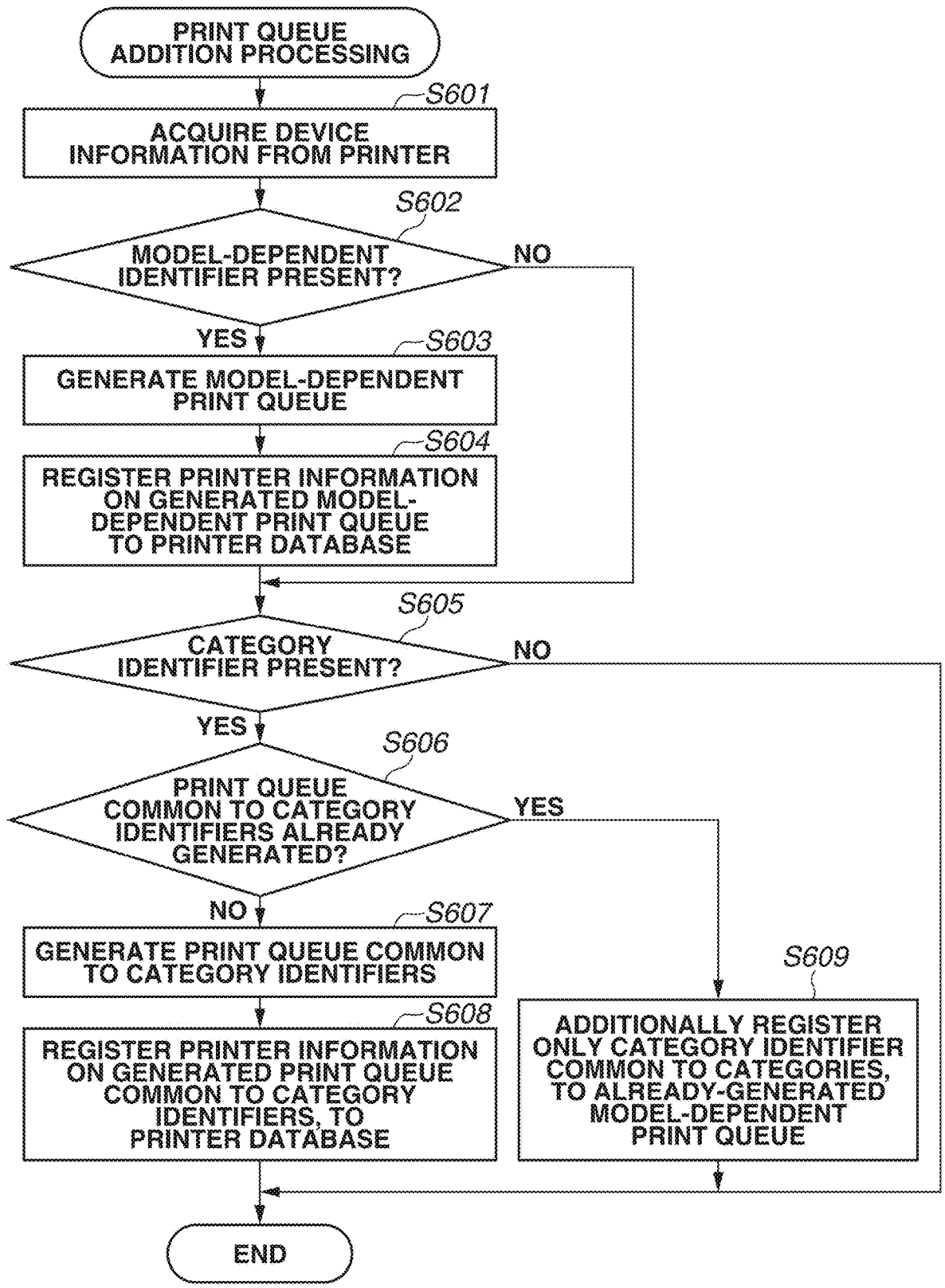
FIG. 6 is a flowchart illustrating processing to generate a print queue and to register printer information to the printer database in the cloud print service.

FIG. 6 is a flowchart illustrating processing performed by the cloud print service 500 to generate the print queue (step S412 in FIG. 4) and to register the printer information to the printer database 510 (step S413 in FIG. 4) according to the present exemplary embodiment. Unless otherwise noted, the processing is performed by the processing units of the cloud print service 500. Further, the processing is started at a timing corresponding to when the printer 200 transmits the registration request to the cloud print service 500 in step S411 described in FIG. 4. First, in step S601, the print queue generation unit 502 acquires the device information from the request source printer 200. The device information is acquired from the printer 200 by using bidirectional communication through the network 150. Further, contents of the information are acquired by, for example, an XML schema illustrated in FIG. 7; however, the acquisition method is not limited thereto. The printer name (device name), the HWID, the CategoryID, and the like described with reference to FIG. 5 are acquired from information mainly defined by "<p:DeviceId>" 700 of the schema illustrated in FIG. 7. In step S602, it is determined whether the acquired device information includes the model-dependent identifier (HWID). More specifically, it is determined whether the device information includes a value defined by "MDL" 701 that is defined by "<p:DeviceId>" 700 in the schema illustrated in FIG. 7. In a case where the model-dependent identifier is not present (NO in step S602); the processing proceeds to step S605 without generating the print queue. In a case where the model-dependent identifier is present (YES in step S602), a model-dependent print queue is generated in step S603. Further, in step S604, the printer registration unit 501 registers the acquired device information to the printer database 510 as model-dependent print queue information for each model that has generated the acquired device information. For example, a device "Can iR-ADV CCCC" in FIG. 5 has a model-dependent identifier, and is accordingly registered by this processing. In step S605, the print queue generation unit 502 determines whether the previously-acquired device information includes a category identifier (CategoryID). More specifically, it is determined based on whether the device information includes a value defined by "CID" 702 that is defined by "<p:DeviceId>" 700 in the schema illustrated in FIG. 7. In a case where the category identifier is not present (NO in step S605), the print queue generation processing and the registration processing is ended. In a case where the category identifier is present (YES in step S605), the processing proceeds to step S606. In step S606, it is determined whether a print queue common to the category identifier has been already generated. In a case where the print queue common to the category identifier has not been generated yet (NO in step S606), the processing proceeds to step S607. In step S607, the print queue common to the category identifier is generated. Further, in step S608, the printer registration unit 501 registers the acquired print information to the printer database 510 as category-common print queue information. For example, the device "Can OIP Common Printer" in FIG. 5 does not have the model-dependent identifier, and is accordingly registered by this processing. In a case where the print queue common to the category identifier has been already generated (YES in step S608), the processing proceeds to step S609. In step S609, only the category identifier common to the category is additionally registered to the already-generated model-dependent print queue.

Figure 8:
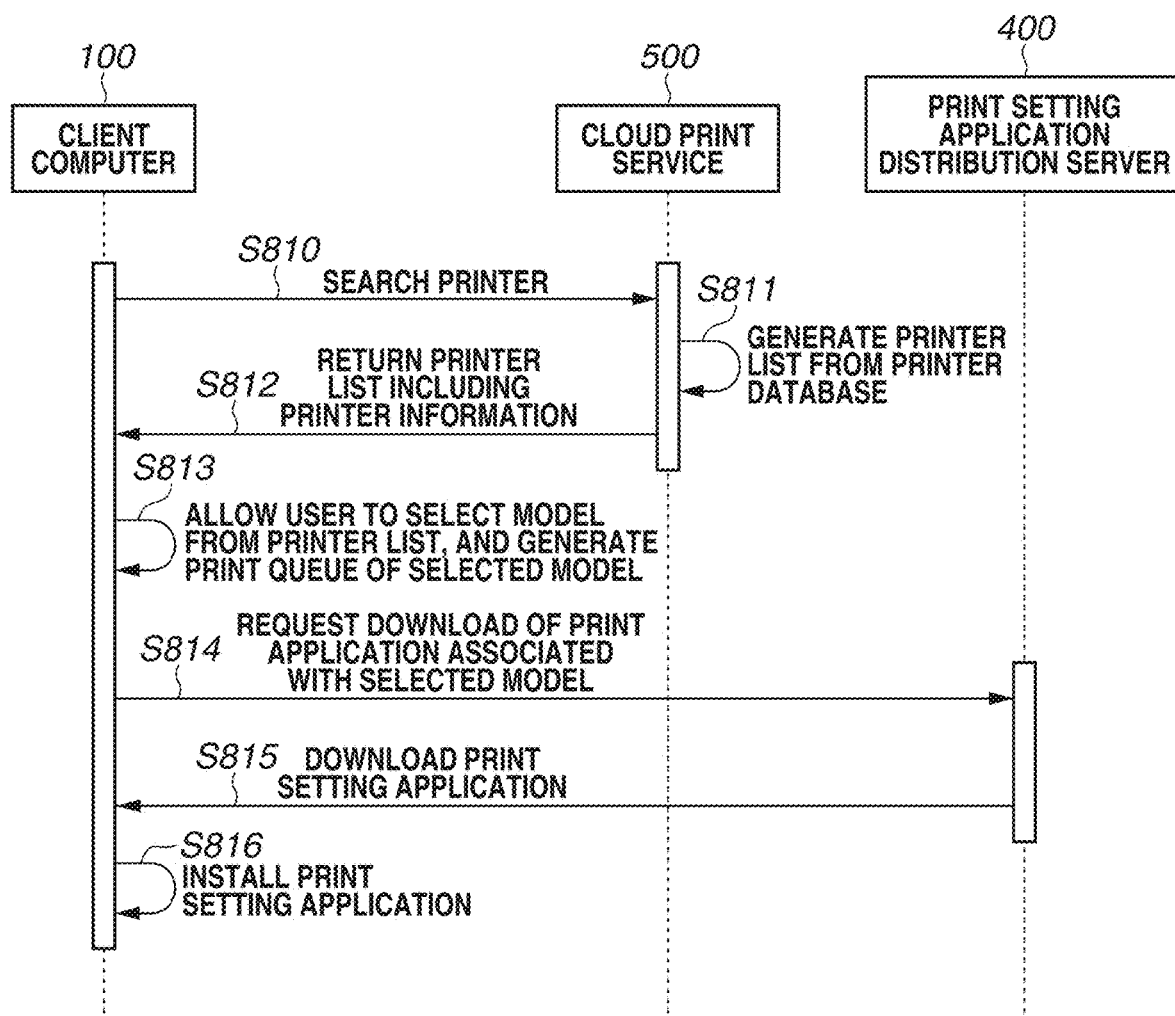
FIG. 8 is a sequence diagram illustrating a sequence to install a print setting application in the client computer.

FIG. 8 is a sequence diagram illustrating processing of installing the print setting application 1052 in the client computer 100 according to the present exemplary embodiment.

To perform output to the printer 200 with use of the cloud printing, the client computer 100 transmits the print job to the cloud print service 500. Therefore, it is necessary to generate, in the client computer 100, the print queue for transmitting the print job to the cloud print service 500.

In the present exemplary embodiment, a printer search function that is included as a standard function in the operating system 1053 is used. In normal printer search, printers on the same intranet are targets. For example, in FIG. 2, when the client computer 100 performs the printer search, the client computer 100 can find the printer 200, but cannot find the printer 201 and the printer 202 that are not located on the same intranet. In the present exemplary embodiment, however, the client computer 100 can access the cloud print service 500. Accordingly, in a case where the printers are registered to the cloud print service 500, the client computer 100 can find the registered printers by the printer search. In the present exemplary embodiment, the printer 201 and the printer 202 are assumed to be registered with the cloud print service 500.

In step S810, the client computer 100 performs the printer search that is the standard function of the operating system 1053 described above. Upon receiving information on the printer search in step S810, the search response unit 504 of the cloud print service 500 presents usable printers to the client computer 100. In this case, the cloud print service 500 generates a printer list including connectable printer information in step S811. The printer information includes the printer name (device name), the HWID for identification of the model of the printer, and the IP address of the printer described above. The printer list generation unit 503 of the cloud print service 500 generates the printer list which includes the printer information With use of the information in the printer database 510.

In step S812, the cloud print service 500 returns the generated printer list to the client computer 100. At this time, the printer information included in the printer list is transmitted together with the information on the HWID that is the printer identification information described in FIG. 5. The client computer 100 presents the usable printers to the user based on the printer list. The user selects the model from the presented printer list. After selection is performed, the operating system 1053 of the client computer 100 generates the internal print queue of the corresponding model on the client computer.

When generation of the print queue has succeeded, the operating system 1053 of the client computer 100 transmits a download request to the print setting application distribution server 400 in step S814. At this time, the operating system 1053 transmits the download request of the print setting application 1052 associated with the HWID that is the printer identification information on the target. In the present exemplary embodiment, in the distribution server 400, the HWID included in the printer information and the print setting application 1052 are associated one-to-one. That is, the print setting application 1052 is uniquely determined with respect to the specific HWID.

Further, in the distribution server 400, metadata may be stored which associates a print setting application 1052 with a specific HWID. In this case, the appropriate print setting application 1052 for the HWID included in the received printer information is identified and downloaded with use of the metadata.

Upon receiving the download request in step S814, the print setting application distribution server 400 transmits the print setting application 1052 to the client computer 100. In step S816, the client computer 100 installs the print setting application 1052.

After the installation, the print setting application 1052 is associated with the printer 200 one-to-one. Accordingly, the print setting application 1052 can present an appropriate print setting UI to the user for the printer 200 because the print setting application 1052 holds the model information and the print setting information for the printer 200. Alternatively, the print setting application 1052 may communicate with the cloud print service 500, acquire the model information and the print setting information on the target, and provide the UI with use of the information. When installation of the print setting application 1052 is completed, the user can change detailed print settings.

Figure 15:
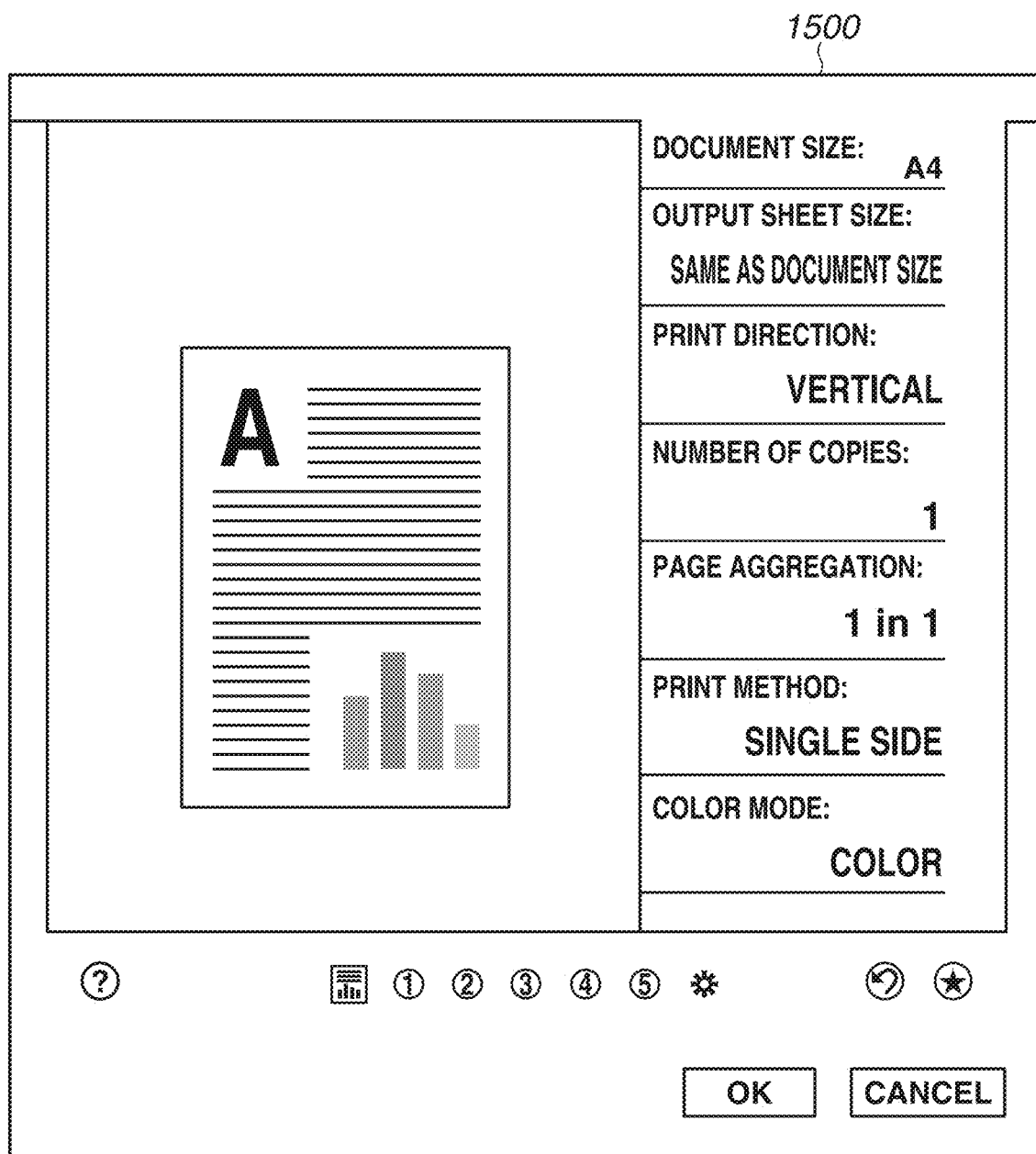
FIG. 15 is a diagram illustrating an example of a user interface (UI) to change print setting.

When the user chooses to use cloud printing, the user usually instructs printing from the application 1051 of the client computer 100. As a specific example, the user may press a print button in a file menu of the application 1051. When the print instruction from the user is received, the application 1051 normally instructs the OS 1053 to display a print common dialog (print setting screen provided by OS). The OS 1053 receives the instruction from the application 1051, and displays the print common dialog. In the print common dialog displayed by the OS 1053, the list of the printers installed in the client computer 100 can be displayed, a page to be printed can be designated, and the number of copies can be set. Here the user selects the output printer, which uses the cloud print service, from the print common dialog and presses a detailed setting button (object) displayed on the same screen to give the print setting change instruction to the OS 1053. At this time, the installed print setting application 1052 is activated, and a print setting change UI 1500 as illustrated in FIG. 15 is displayed. In addition, the UI 1500 may be configured in such a manner that more print settings, for example, settings of image processing such as density and color tone, availability of stamp synthesis, and settings of punch positions and staple positions, are changeable. When the user changes the print settings and instructs printing on the print setting UI, the data to be printed is transmitted to the cloud print service 500.

Figure 9:
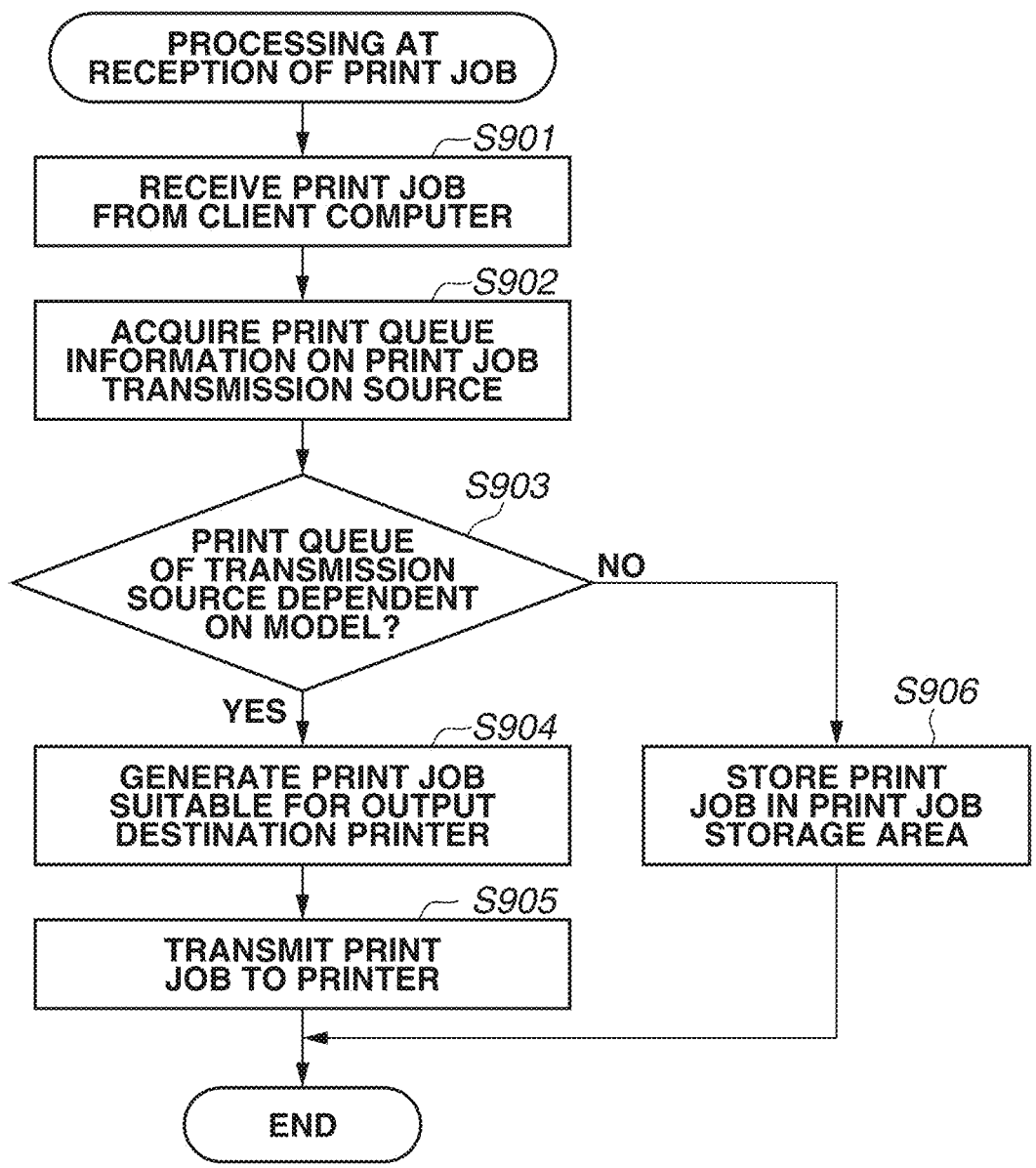
FIG. 9 is a flowchart illustrating processing performed by the cloud print service when a print job is received from the client computer.

FIG. 9 is a flowchart illustrating processing performed when the cloud print service 500 receives the print job from the client computer 100. Unless otherwise noted, the processing is performed by the processing units of the cloud print service 500. First, in step S901, the print job is received from the client computer 100. In step S902, the print job management unit 505 acquires the print queue information on the print job transmission source. One example, of a method of acquiring the print queue information includes a method of specifying the print queue from the print job information, however, the methods are not limited thereto. After the print queue information is acquired, it is determined whether the print queue is a model-dependent print queue or a category-common print queue in step S903. The determination is performed in such a manner that, for example, the corresponding printer information is acquired from the printer information list in FIG. 5, and it is determined whether the model-dependent identifier (HWID) of the acquired printer information is present. In a case where the print queue is the model-dependent print queue (YES in step S903), the processing proceeds to step S904. In step S904, the print job generation unit 506 generates the print job suitable for the output destination printer. In step S905, in response to generation completion of the print job, the print job generation unit 506 transmits the generated print job to the specified printer. In a case where the print queue is not the model-dependent print queue (NO in step S903), the processing proceeds to step S906. In step S906, the print job is stored in the print job storage area 511. In this case, the print job is not automatically transmitted to the printer, but rather, when a print job acquisition request (i.e., transmission request) is received from the printer, the print job is transmitted to the printer as a response to the transmission request. FIG. 10 is a table illustrating an example of the print job database held by the print job storage area of the cloud print service 500. The print job ID, the print job name, and the CategoryID of the print queue are registered in association with one another.

Figure 11:
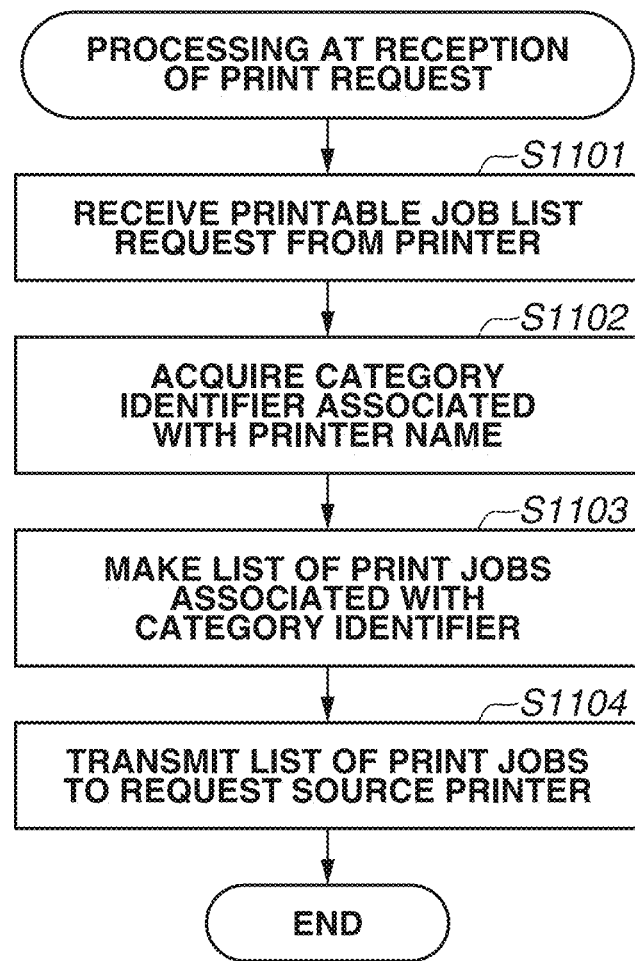
FIG. 11 is a flowchart illustrating processing performed when the cloud print service receives a printable job list request from the printer.

FIG. 11 is a flowchart illustrating processing performed when the cloud print service 500 receives a printable job list request from the printer 200. Unless otherwise noted, the processing is performed by the processing units of the cloud print service 500. First, in step S1101, the printable job list request is received from the printer 200. The printable job list request includes the printer name. In step S1102, the print job management unit 505 having received the request acquires the category identifier from the printer name. More specifically, the print job management unit 505 refers to the printer database 510 to acquire the category identifier (CategoryID) associated with the printer name (device name). In step S1103, the print jobs associated with the acquired category identifier are listed. More specifically, the print job management unit 505 makes a list of the print jobs associated with the category identifier (CategoryID) from the database in the print job storage area 511. FIG. 12 is a table illustrating an example of a list of the print jobs printable by the printer 200 as the printable job list request source, searched and listed from the print job database in FIG. 10. In step S1104, the generated print job list (e.g., list in FIG. 12) is transmitted to the request source printer.

Figure 13:
FIG. 13 is a diagram illustrating an example of an operation panel displaying the printable job list received from the cloud print service.

When the printer 200 receives the transmitted printable job list, the printable job list is displayed on the operation panel. FIG. 13 illustrates an example of the operation panel on which the printable job list received from the cloud print service 500 is displayed. The user selects a desired print job on the operation panel, and presses a print button to perform printing. The printer 200 having received the print execution instruction transmits the print job acquisition request to the cloud print service 500. The acquisition request includes the ID of the print job to be acquired, i.e., the print job ID of the print job.

Figure 14:
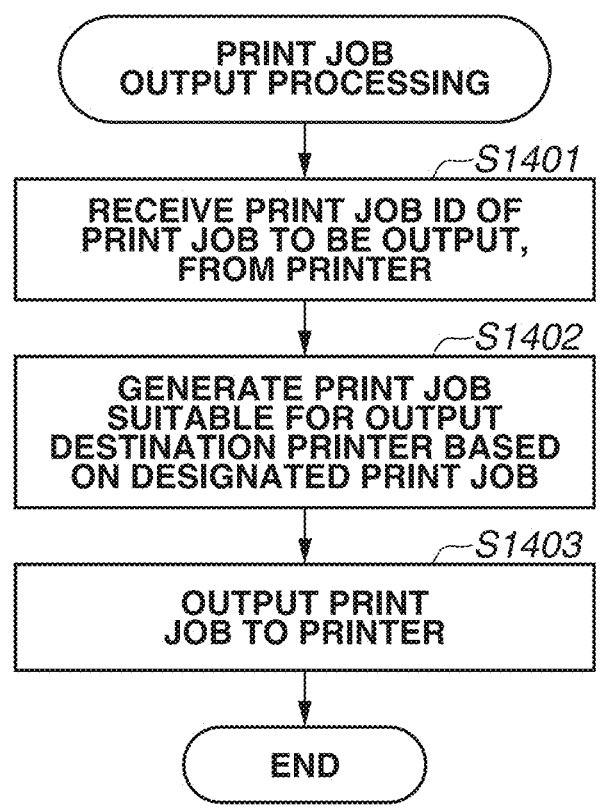
FIG. 14 is a flowchart illustrating processing performed when the cloud print service receives a print execution request from the printer.

FIG. 14 is a flowchart illustrating processing performed by the cloud print service 500 when the cloud print service 500 receives the print job acquisition request from the printer 200, according to the present exemplary embodiment. Unless otherwise noted, the processing is performed by the processing units of the cloud print service 500. First, in step S1401, the print job acquisition request (including print job ID of print job to be output) is received from the printer 200. In step S1402, the print job management unit 505 having received the request generates the print job suitable for the output destination printer 200 based on the designated print job. After generation of the print job is completed, the print job is output to the printer 200 as the print request source in step S1403.

It is possible to propose, by the above-described method, a mechanism in which the print job is registered in the cloud, and the image forming apparatus acquires the print job from the cloud by authentication by the cloud.

Other Exemplary Embodiments

The present disclosure can be realized by supplying a program implementing one or more functions of the above-described exemplary embodiments to a system or an apparatus through a network or a storage medium and causing one or more processors of a computer in the system or the apparatus to read out and execute the program. Further, the present disclosure can be realized by a circuit (e.g., application specific integrated circuit (ASIC)) implementing one or more functions.

According to another exemplary embodiment, detailed print setting suitable for the image forming apparatus is possible in the cloud printing using the cloud print service.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-088591, filed May 8, 2019, which is hereby incorporated by reference herein in its entirety.

What is claimed is:

1. An information processing apparatus, connectable to a server system including a first print queue for managing a print job to be transmitted to an image forming apparatus, the information processing apparatus comprising:
an obtaining unit configured to obtain information identifying one or more available print queues, including the first print queue, in the server system;
a generation unit configured to generate, in the information processing apparatus, a second print queue for managing a print job to be transmitted to the first print queue, based on a user selection of the first print queue from among the one or more available print queues identified based on the obtained information; and
a download unit configured to download a print setting application for setting print setting values to be included in the print job, based on information related to the first print queue.

2. The information processing apparatus according to claim 1, wherein the information related to the first print queue is information about a vendor that has manufactured the image forming apparatus.

3. The information processing apparatus according to claim 1, wherein the download unit downloads the print setting application based on generation of the second print queue.

4. The information processing apparats according to claim 1, further comprising:
an installation unit configured to install the downloaded print setting application;
an activation unit configured to activate the installed print setting application in response to a user selecting an object for performing detailed print setting while the generated second print queue is selected; and
a second generation unit configured to generate the print job to be transmitted to the first print queue, wherein the print job includes the print setting values set by the activated print setting application.

5. The information processing apparatus according to claim 1, further comprising:
a search unit configured to search for an image forming apparatus to which the information processing apparatus transmits a print job and the one or more available print queues included in the server system.

6. The information processing apparatus according to claim 1, wherein the first print queue in the server system is generated based on a request received by the server system from the image forming apparatus.

7. The information processing apparatus according to claim 1, wherein the print setting application provides a print setting screen that enables setting of an item that is not settable on a print setting screen provided by the server system.

8. The information processing apparatus according to claim 1, further comprising:
a display unit configured to display one or more names of print queues corresponding to the received information of the one or more available print queues,
wherein the user selection of the first print queue is a selection of a name corresponding to the first print queue from among the displayed one or more names.

9. An information processing apparatus, connectable to a server system registering information of an image forming apparatus in association with a first print queue that is to be used for transmitting print data to the image forming apparatus, the information processing apparatus comprising:

a controller including a processor, the controller being configured to:
obtain the registered information of the image forming apparatus from the server system, wherein the obtained information is stored in association with a second print queue;
download a print setting application specified based on information related to the obtained information of the image forming apparatus, wherein the print setting application is to be used for setting print setting values to be included in the print data; and
transmit the print data to the server system.

10. The information processing apparatus according to claim 9, wherein the controller is further configured to:
generate the print data including print setting set by the downloaded print setting application.

11. The information processing apparatus according to claim 9, wherein the downloaded print setting application causes the information processing apparatus to display a print setting screen.

12. The information processing apparatus according to claim 9, wherein the transmitted print data is to be transmitted to the image forming apparatus by the server system.

13. The information processing apparatus according to claim 9, wherein the controller is further configured to:
receive a user instruction for obtaining the information of the image forming apparatus from the server system, wherein the obtaining is performed based on the received user instruction.

14. The information processing apparatus according to claim 9, wherein the information related to the obtained information is information identifying the print setting application.

15. The information processing apparatus according to claim 14, wherein the controller is further configured to:
transmit the obtained information of the image forming apparatus to another server system, wherein said another server system stores the information identifying the print setting application corresponding to the information of the image forming apparatus.

16. The information processing apparatus according to claim 9, wherein the information of the image forming apparatus is information identifying a model of the image forming apparatus.

17. The information processing apparatus according to claim 9, wherein the second print queue is generated in the information processing apparatus and the print data is transmitted to the server system via the second print queue.

18. A method for controlling an information processing apparatus, connectable to a server system registering information of an image forming apparatus in association with a first print queue that is to be used for transmitting print data to the image forming apparatus, the method comprising:
obtaining the registered information of the image forming apparatus from the server system, wherein the obtained information is stored in association with a second print queue;
downloading a print setting application specified based on information related to the obtained information of the image forming apparatus, wherein the print setting application is to be used for setting print setting values to be included in the print data; and
transmitting the print data to the server system.

19. The method according to claim 18, further comprising:
generating the print data including print setting set by the downloaded print setting application.

20. The method according to claim 18, wherein the downloaded print setting application causes the information processing apparatus to display a print setting screen.

21. The method according to claim 18, wherein the transmitted print data is to be transmitted to the image forming apparatus by the server system.

22. The method according to claim 18, wherein the method further comprises:
receiving a user instruction for obtaining the information of the image forming apparatus from the server system, wherein the obtaining is performed based on the received user instruction.

23. The method according to claim 18, wherein the information related to the obtained information is information identifying the print setting application.

24. The method according to claim 23, wherein the method further comprises:
transmitting the obtained information of the image forming apparatus to another server system, wherein said another server system stores the information identifying the print setting application corresponding to the information of the image forming apparatus.

25. The method according to claim 23, wherein the information of the image forming apparatus is information identifying a model of the image forming apparatus.

26. The method according to claim 18, wherein the second print queue is generated in the information processing apparatus and the print data is transmitted to the server system via the second print queue.

27. A non-transitory computer-readable storage medium storing a program for causing a computer to execute each step of a control method for an information processing apparatus connectable to a server system registering storing information of an image forming apparatus in association with a first print queue that is to be used for transmitting print data to the image forming apparatus, the control method comprising:
obtaining the registered information of the image forming apparatus from the server system, wherein the obtained information is stored in association with a second print queue;
downloading a print setting application specified based on information related to the obtained information of the image forming apparatus, wherein the print setting application is to be used for setting print setting values to be included in the print data; and
transmitting the print data to the server system.

28. The non-transitory computer-readable storage medium according to claim 27, wherein the downloaded print setting application causes the information processing apparatus to display a print setting screen.

29. The non-transitory computer-readable storage medium according to claim 27, wherein the information related to the obtained information is information identifying the print setting application.

30. The non-transitory computer-readable storage medium according to claim 29, wherein the method further comprises:
transmitting the obtained information of the image forming apparatus to another server system, wherein said another server system stores the information identifying the print setting application corresponding to the information of the image forming apparatus.

31. The non-transitory computer-readable storage medium according to claim 27, wherein the information of the image forming apparatus is information identifying a model of the image forming apparatus.

32. The non-transitory computer-readable storage medium according to claim 27, wherein the second print queue is generated in the information processing apparatus and the print data is transmitted to the server system via the second print queue.

33. An image forming system comprising:
an information processing apparatus that transmits print data;
a server system that receives the transmitted print data; and
an image forming apparatus that receives the transmitted print data from the server system and performs printing based on the transmitted print data received from the server system,
wherein the image forming apparatus includes:
a first receiving unit configured to receive a user instruction for registering information of the image forming apparatus; and
a first transmission unit configured to transmit the information of the image forming apparatus to the server system based on the received user instruction;
wherein the server system includes:
a second receiving unit configured to receive the transmitted information of the image forming apparatus from the image forming apparatus;
a registration unit configured to register the received information of the image forming apparatus in association with a first print queue; and
a second transmission unit configured to transmit the received information of the image forming apparatus to the information processing apparatus; and
wherein the information processing apparatus includes:
a third receiving unit configured to receive the information of the image forming apparatus from the server system, wherein the received information is stored in association with a second print queue;
a downloading unit configured to download a print setting application based on information related to the received information of the image forming apparatus; and
a third transmission unit configured to transmit, to the server system, print data including print setting values set by the downloaded print setting application.

34. The image forming system according to claim 33, wherein the first print queue manages print data to be transmitted to the image forming apparatus.

35. The image forming system according to claim 33, wherein the second print queue manages print data to be transmitted to the server system.

36. The image forming system according to claim 33, wherein the information of the image forming apparatus is model information of the image forming apparatus.

37. The image forming system according to claim 33, wherein the downloading unit downloads the print setting application from another server system.

* * * * *